United States Patent [19]
Van Zee

[11] Patent Number: 5,129,208
[45] Date of Patent: Jul. 14, 1992

[54] APPARATUS FOR FEEDING WRAP MATERIAL INTO A BALE-FORMING CHAMBER FOR WRAPPING A LARGE ROUND BALE

[75] Inventor: Daryl Van Zee, Pella, Iowa

[73] Assignee: Vermeer Manufacturing Company, Pella, Iowa

[21] Appl. No.: 577,762

[22] Filed: Sep. 5, 1990

[51] Int. Cl.⁵ .............................................. B65B 11/04
[52] U.S. Cl. .................................. 53/118; 53/389.5; 53/587
[58] Field of Search ............... 53/118, 211, 389, 215, 53/587, 389.5; 100/87

[56] References Cited

U.S. PATENT DOCUMENTS

| | | | |
|---|---|---|---|
| 1,033,968 | 7/1912 | Waldron | 53/215 X |
| 2,114,008 | 4/1938 | Wunderlich | 53/215 X |
| 4,333,301 | 6/1982 | Koutonen | 53/211 X |
| 4,485,612 | 12/1984 | Piesen | 53/211 X |
| 4,779,526 | 10/1988 | Frerich | 53/118 X |
| 4,787,193 | 11/1988 | Verhulst | 53/118 |
| 4,917,008 | 4/1990 | van den Wildenberg | 53/587 |

FOREIGN PATENT DOCUMENTS

| | | | |
|---|---|---|---|
| 2705101 | 8/1978 | Fed. Rep. of Germany | 53/118 |
| 2146947 | 5/1985 | United Kingdom | 53/118 |

Primary Examiner—John Sipos
Attorney, Agent, or Firm—Kent A. Herink; Brian J. Laurenzo

[57] ABSTRACT

A bale wrapping apparatus for a baler for large round bales. A rolled web of bale wrapping material is mounted at the rear of the baler. A pair of adjacent feed rollers frictionally grip a free end portion of the web. One or more web feeding belts are in driving engagement with at least one bale-forming belt of the baler. The web feeding belts power a control mechanism for the feed rollers. When a bale is formed in the baler, the feed rollers pull wrapping material off the roll and deposit it on the web feeding belts which carry it into the baling chamber where it is wrapped around the bale. A knife is actuated near the end of the wrapping to separate the web. A conventional twine-tie mechanism can be operated simultaneously with the bale wrapping apparatus and after the web has been separated so as to further secure the wrapping material about the bale.

12 Claims, 10 Drawing Sheets

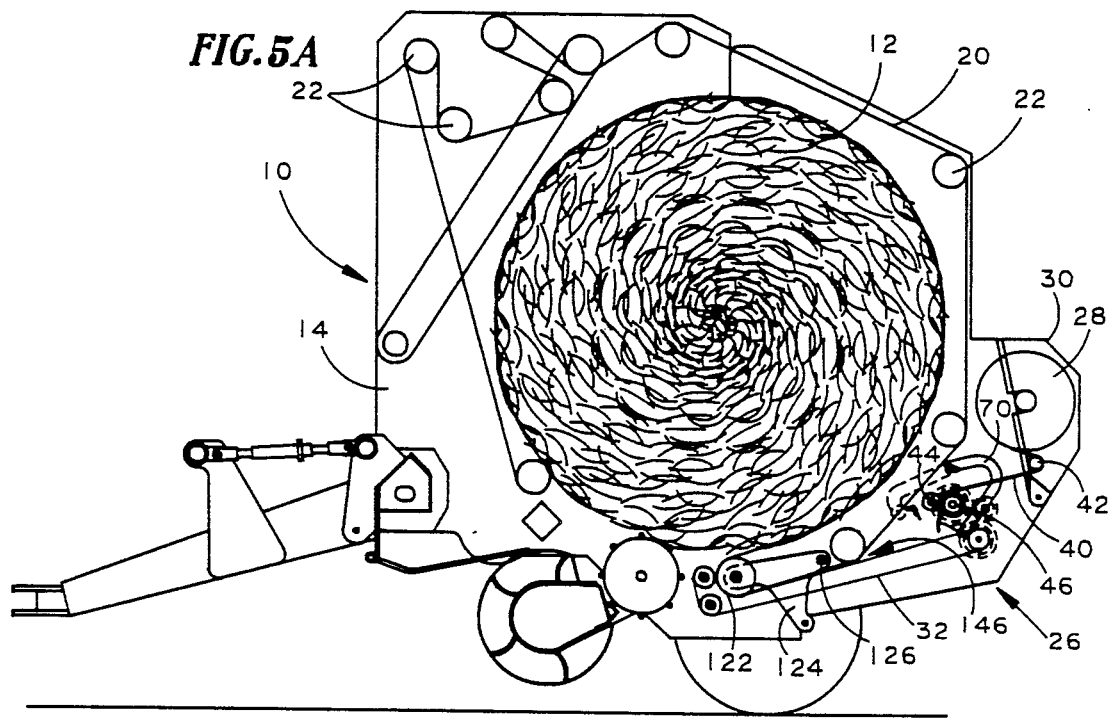

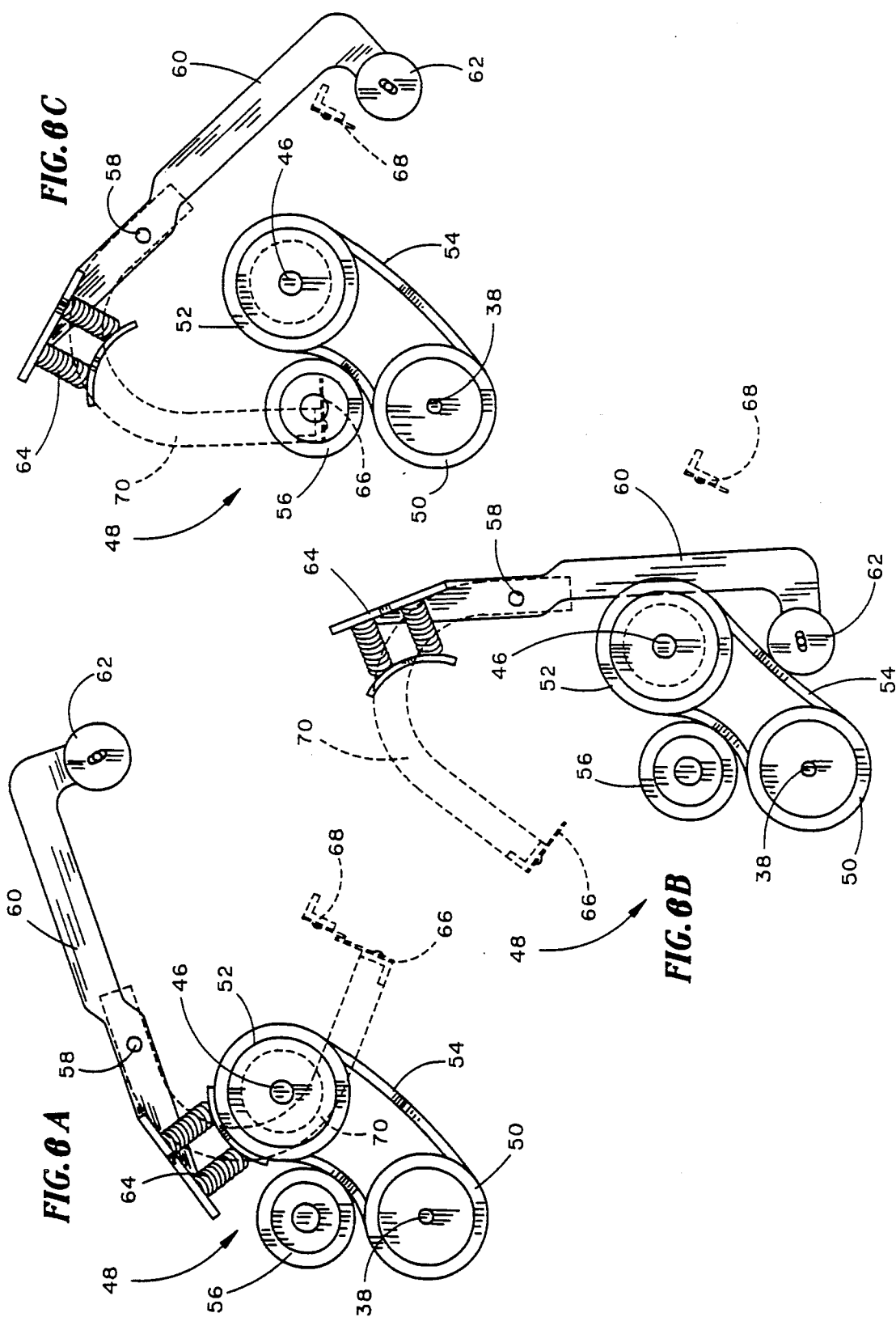

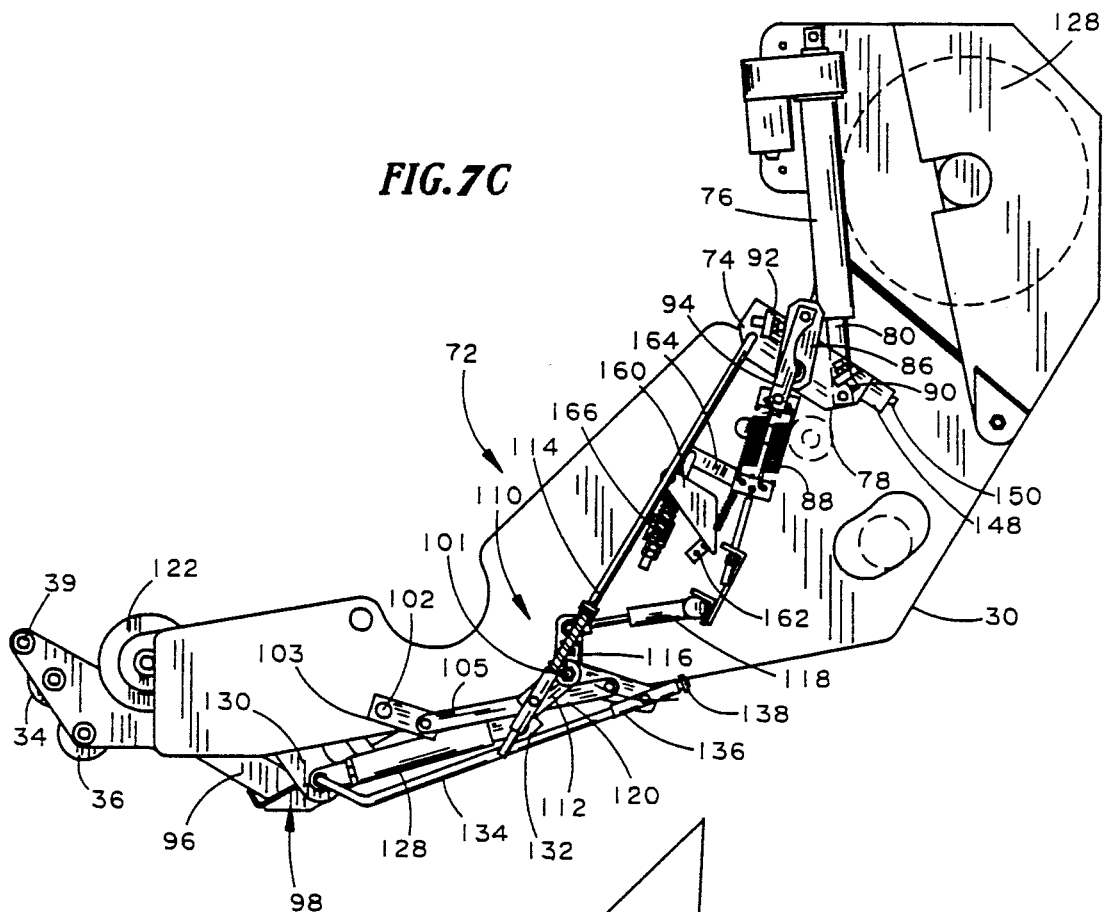
FIG.7C
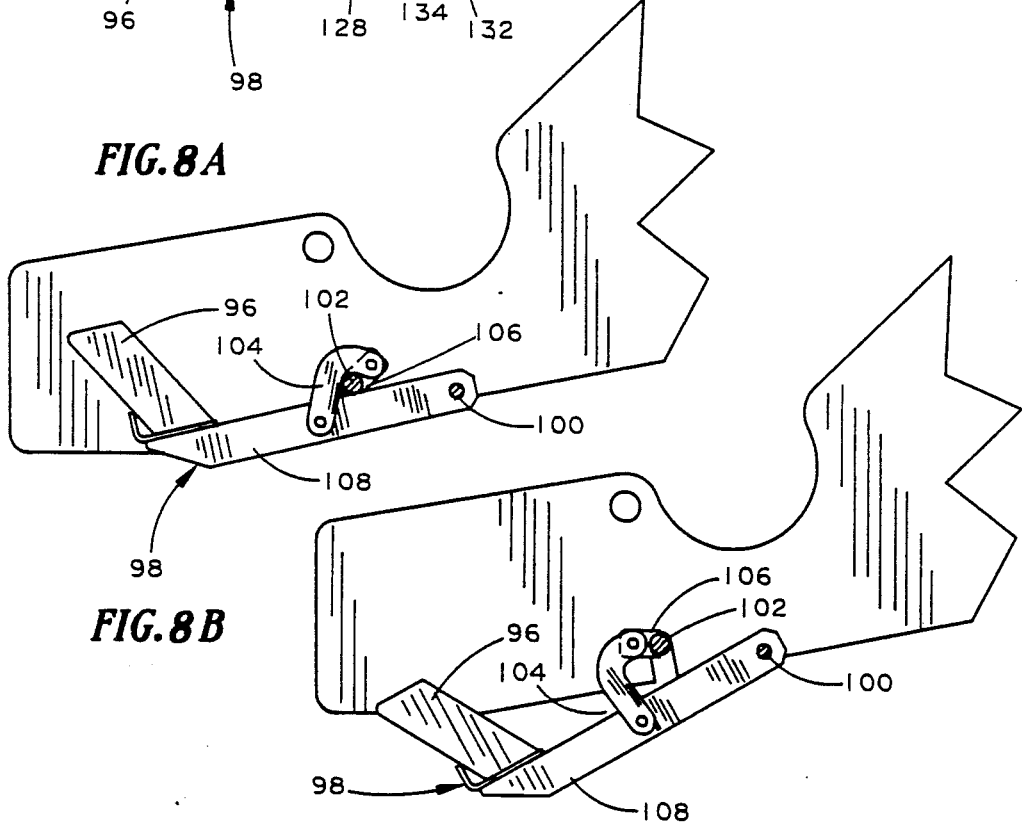
FIG.8A
FIG.8B

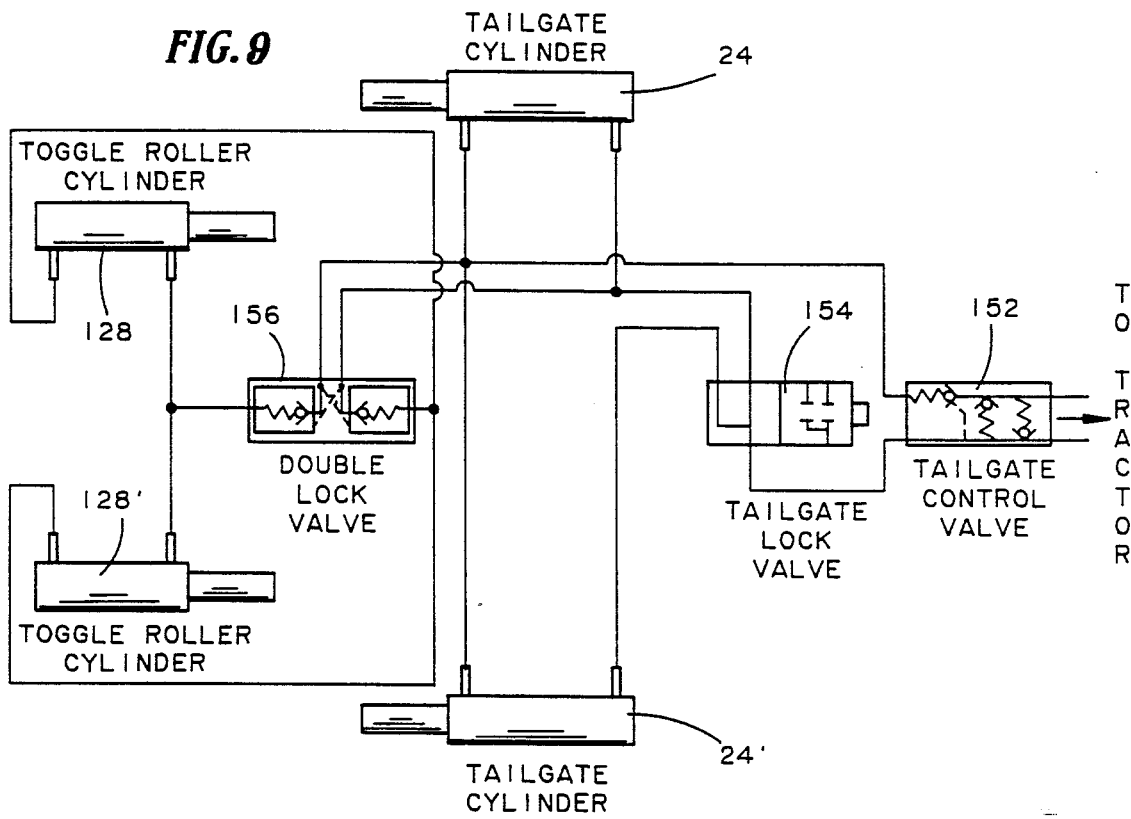
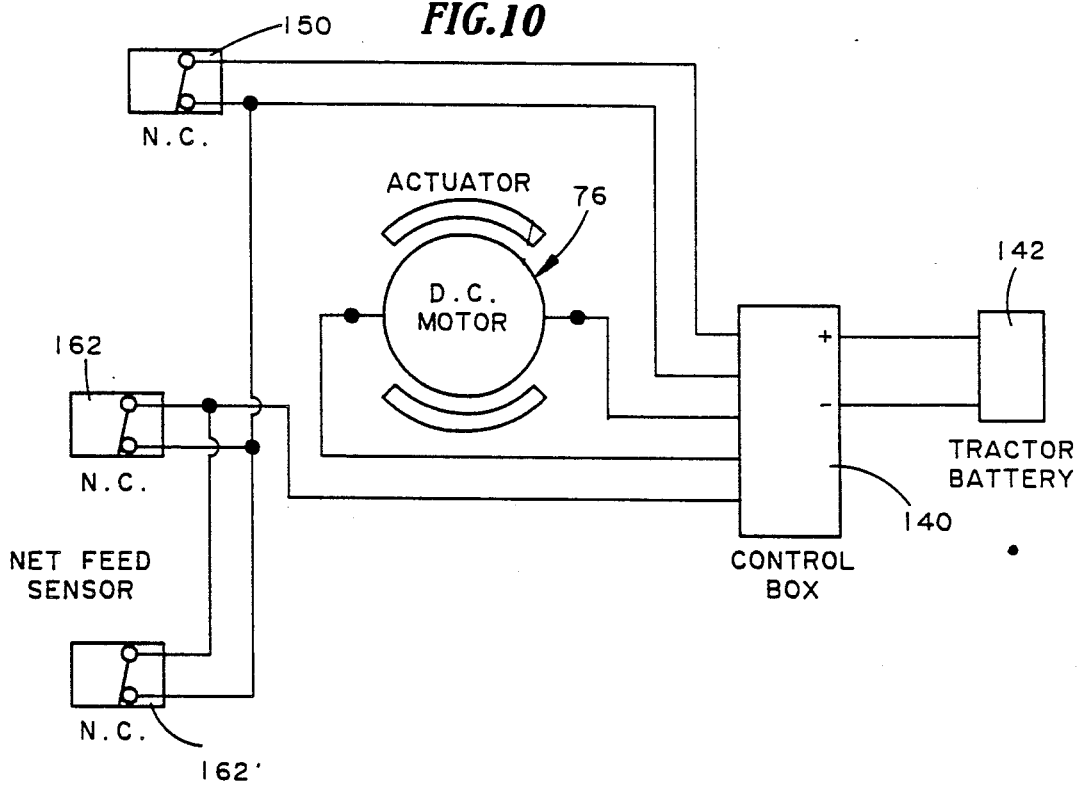

APPARATUS FOR FEEDING WRAP MATERIAL INTO A BALE-FORMING CHAMBER FOR WRAPPING A LARGE ROUND BALE

BACKGROUND OF THE INVENTION

The present invention relates to large round balers and, more particularly, to an apparatus for feeding a wrapping material into a bale-forming chamber of a baler for wrapping a large round bale.

Many apparatus are known for wrapping a large round bale with wrap material, such as plastic sheeting. A roll of wrap material is commonly supported for rotation about a horizontal axis at the rear of the large round baler. A feed mechanism, usually including a pair of wrap material feed rollers for pulling the wrap material off the roll, is selectively operated to feed the wrap material into the bale-forming chamber when it is desired to wrap a bale. The feed mechanism must be operable to positively feed wrap material into the bale-forming chamber and to keep tension on the wrap material as it is pulled around the bale. Upon completion of the wrapping process, the wrap material must be cut off and the bale discharged from the baler.

SUMMARY OF THE INVENTION

According to the present invention, there is provided apparatus for feeding wrap material into a bale-forming chamber of a baler for wrapping of a large round bale.

An object of the present invention is to provide apparatus mounted on the tail gate of a baler, which apparatus is powered by the plurality of bale-forming belts and which feeds wrap material into the bale-forming chamber.

Another object is to provide a bale wrap mechanism that includes a belt separator assembly for maintaining the separation of the belts during bale formation and which is retracted during a wrapping operation.

A further object is to disengage the drive assembly of the bale wrap mechanism from the bale-forming belts during discharge of the wrapped bale to prevent back running of the bale wrap mechanism.

Yet another object is to provide an over-center mechanism that is moved by a linear actuator for controlling the operational conditions of the bale wrap mechanism.

Yet a further object is to provide a bale wrap mechanism that may either be manually initiated or automatically initiated upon completion of the bale-forming operation.

Still another object is to operate a conventional twine-tie mechanism simultaneously with the bale wrapping procedure and for a short time thereafter to assist in securing the wrapping material about the bale.

These and other objects will become more apparent from a reading of the following description together with the associated drawings.

BRIEF DESCRIPTION OF THE DRAWINGS

FIGS. 5A-F are diagrammatic views showing the drive and knife assembly of the bale wrap mechanism in sequence from the start of a bale wrapping procedure through discharge of a wrapped bale and in position to begin formation of a succeeding bale;

FIGS. 6A-C are diagrammatic views showing the drive and knife assembly in the drive, free wheel, and braked conditions;

FIGS. 7A-C are diagrammatic views of the drive over-center mechanism corresponding to FIGS. 6A-C, respectively;

FIGS. 8A and 8B are enlarged detail views of the belt separator rack corresponding to FIGS. 7A and 7B, respectively;

FIG. 9 is a schematic representation of the hydraulic circuitry of the present invention; and FIG. 10 is a schematic representation of the electrical control circuitry of the present invention.

DETAILED DESCRIPTION OF A PREFERRED EMBODIMENT

Figure 1:
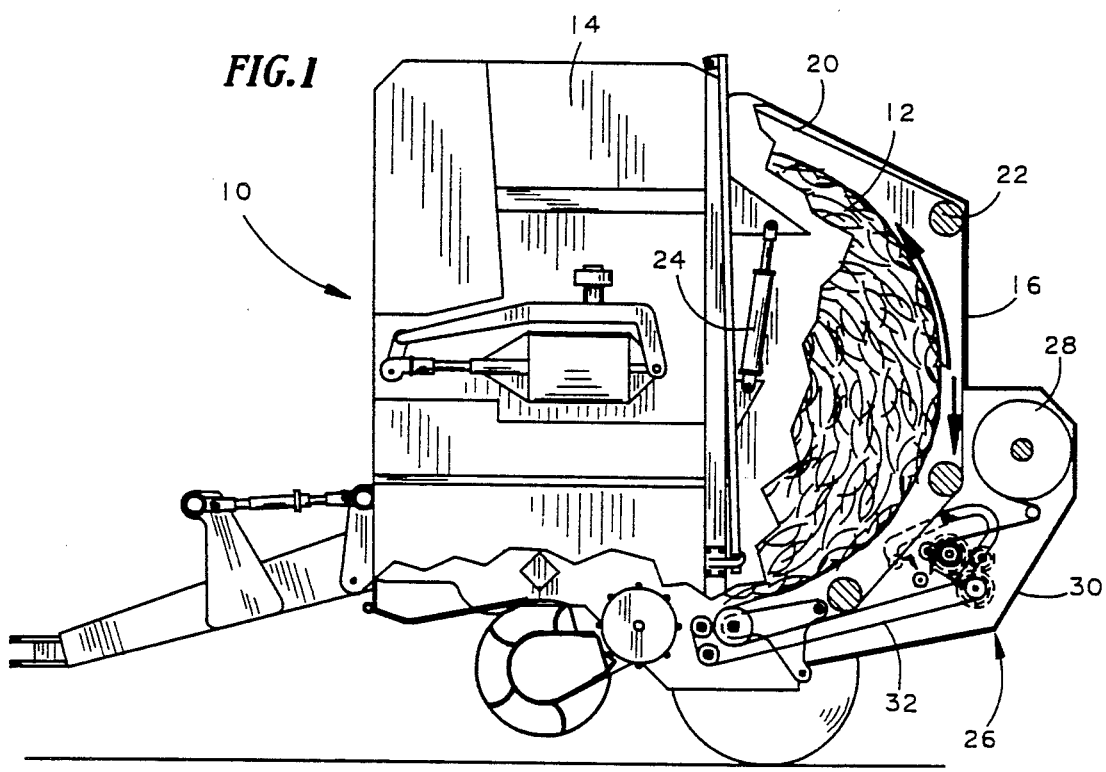
FIG. 1 is a side view of a baler with parts broken away to show a bale wrap mechanism of the present invention that has been mounted on a tail gate of the baler.

Referring to FIG. 1, there is illustrated, generally at 10, a baler for forming large round bales, one of which is illustrated at 12. The baler 10 has a front section 14, to which is pivotally mounted at tail gate 16, which together enclose a bale-forming chamber. The tail gate 16 is pivotally movable relative to the front Section 14 between a closed, bale-forming position (FIG. 1) and an open, bale discharge position (FIG. 5E) by a pair of hydraulic cylinders, one of which is illustrated in FIG. 1 at 24.

A plurality of bale-forming belts, one of which is illustrated at 20, are transversely spaced from one another and carried on a plurality of transversely extended rollers 22 arranged about the periphery of the bale forming chamber. The belts 20 are driven in the direction of the arrows in FIG. 1 such that the bale 12 is rotating in the counterclockwise direction when viewed from the left.

Figure 2:
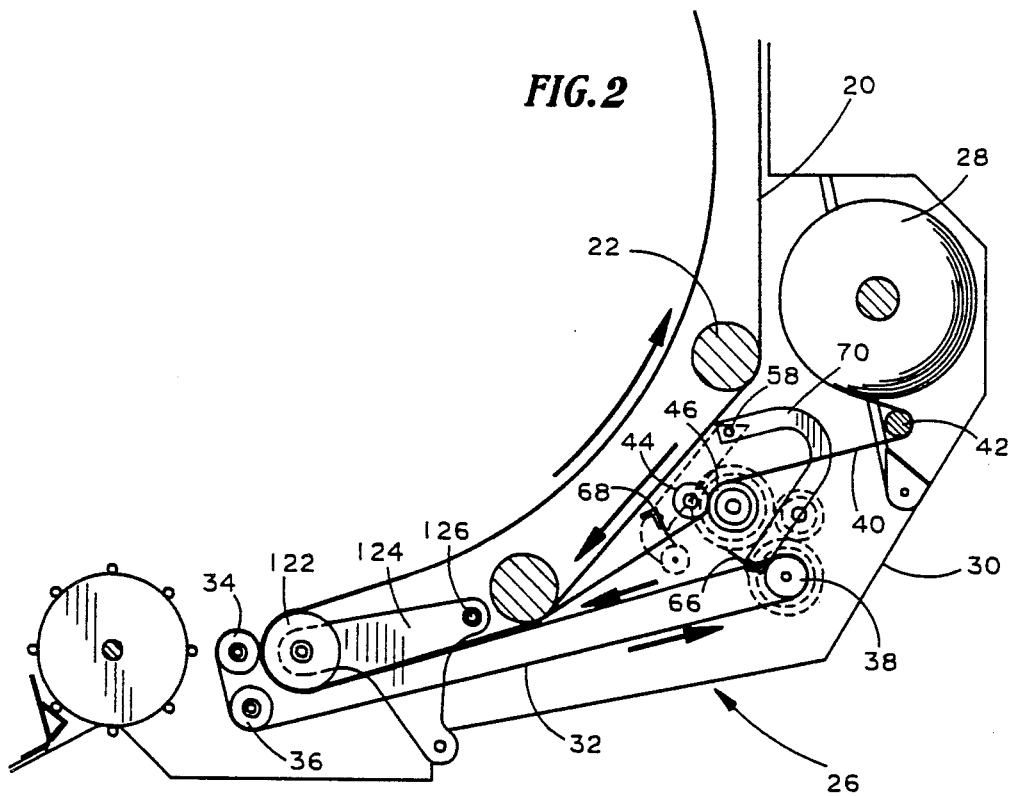
FIG. 2 is an enlarged detail view of the bale wrap mechanism showing a net feed belt in driving frictional engagement with a bale-forming belt of the baler.

A bale wrap feed apparatus 26 is mounted on a lower, rearward portion of the tail gate 16. A roll 28 of a web of wrapping material is mounted for rotation about a transversely extended horizontal axis inside a housing 30 of the wrap feed apparatus 26. Power for the wrap feed apparatus 26 is supplied by a plurality of endless wrap feed belts, one of which is illustrated in FIGS. 1 and 2 at 32, each of which is in driving frictional engagement with a corresponding one of the bale-forming belts 20. The wrap feed belts 32 are driven in the direction of the arrows in FIG. 2 and are trained about three rollers, front upper roller 34, front lower roller 36 and rear roller 38, which, like the rollers 22 extend transversely across the width of the baler 10. Above the front upper roller 34, a blocking bar 39 (FIG. 7) is extended transversely across the width of the baler at the bottom of the baling chamber. The blocking bar 39 functions to help prevent the loss of crop material from the baling chamber forwardly of the wrap feed apparatus 26.

The wrap material on the roll 28 is a web 40 which is trained around a spreading roller 42 and between a pair of wrap feed rollers 44 and 46 which have a rubber outer layer to frictionally grip the web 40 for removal thereof from the roll 28. A drive and brake mechanism for the wrap feed roller 46 is illustrated generally at 48 in FIG. 4. At the right hand end portion of the rear belt roller 38, externally of the housing 30, is secured a drive pulley 50. A driven pulley 52 is mounted on the right end portion of the wrap feed roller 46. A V-belt 54 is trained about the pulleys 50 and 52. A fixed idler pulley 56 is mounted on a support bracket for the rear belt roller 38 and, being located intermediate the pulleys 50 and 52, serves to prevent excessive slack in the V-belt 54. The position of the idler pulley 56 is adjustable relative to the pulleys 50 and 52 to assist in adjusting the tension in the V-belt 54 when the drive mechanism 48 is engaged, as will be described in more detail below.

A drive actuating shaft 58 (FIG. 3) extends transversely across the width of the baler 10. A swinging arm 60 is secured to the right hand end portion of the drive actuating shaft 58 for pivotal movement outside of and adjacent the housing 30 (FIG. 4). The forward end portion of the swinging arm 60 carries an idler pulley 62 which, upon pivotal movement of the swinging arm 60 in the clockwise direction in FIG. 4, will be brought into contact with a forward run of the V-belt 54 between the pulleys 50 and 52 and opposite the fixed idler pulley 56 to drivably engage the drive pulley 50 and the driven pulley 52. The other end of the swinging arm 60 carries a spring cushioned brake shoe 64 which, upon movement of the swinging arm 60 in the counterclockwise direction, will be brought into contact with and brake the driven pulley 52 and therefore the wrap feed roller 46.

As best illustrated in FIGS. 2 and 6, the drive actuating shaft 58 also pivots a swinging knife 66 relative to a fixed knife 68 to separate the web 40 after a bale wrapping operation. Each of the knives 66 and 68 extend transversely across substantially the entire width of the baler 10. The swinging knife 66 is mounted on a U-shaped arm 70 that is moved together with the swinging arm 60. Accordingly, operation of the drive mechanism 48 and of the swinging knife 66 are controlled by pivotal movement of the drive actuating shaft 58.

Figure 3:
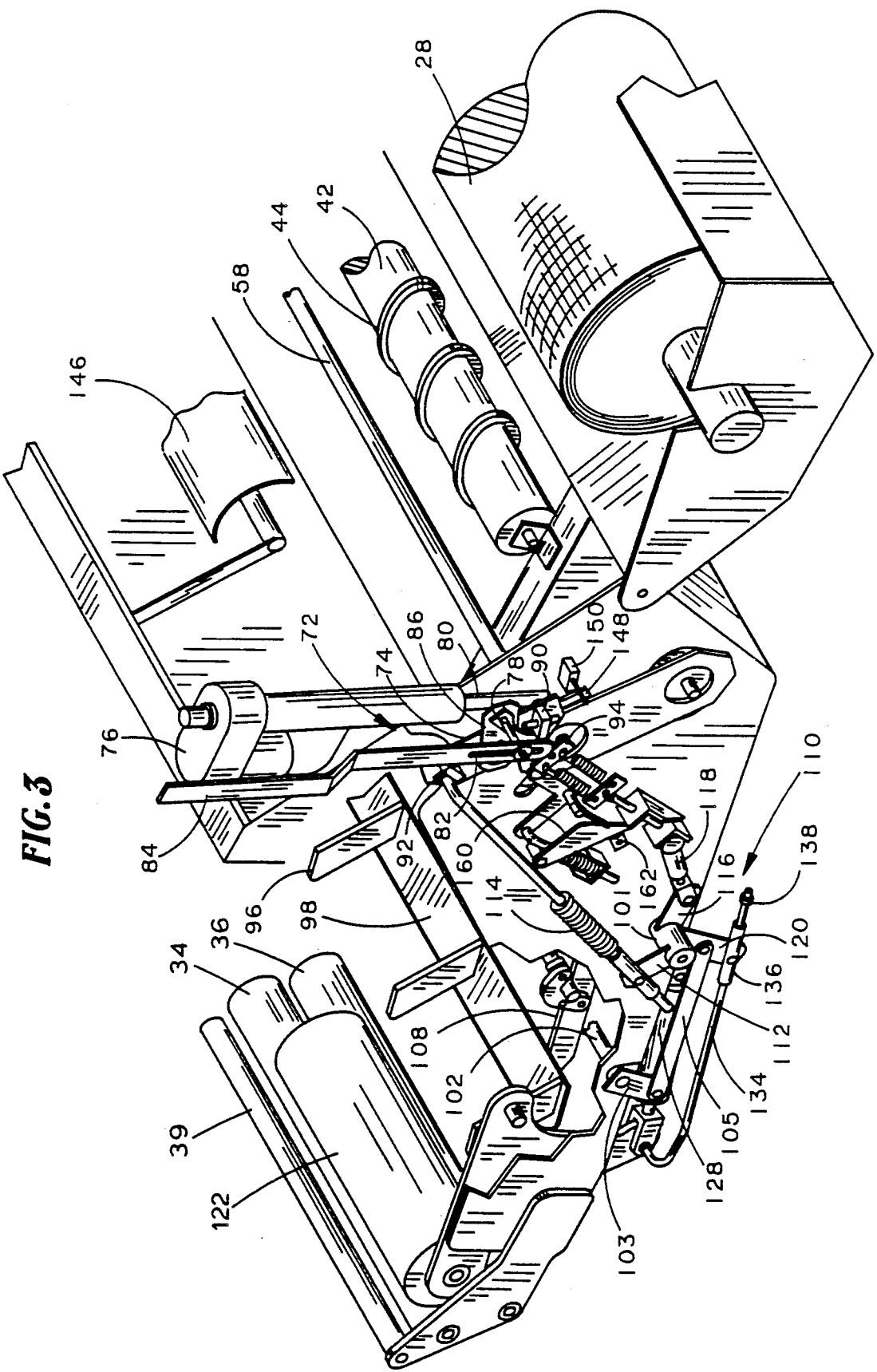
FIG. 3 is a partial perspective view of a drive over-center mechanism mounted on the left hand side of the bale wrap mechanism.
Figure 4:
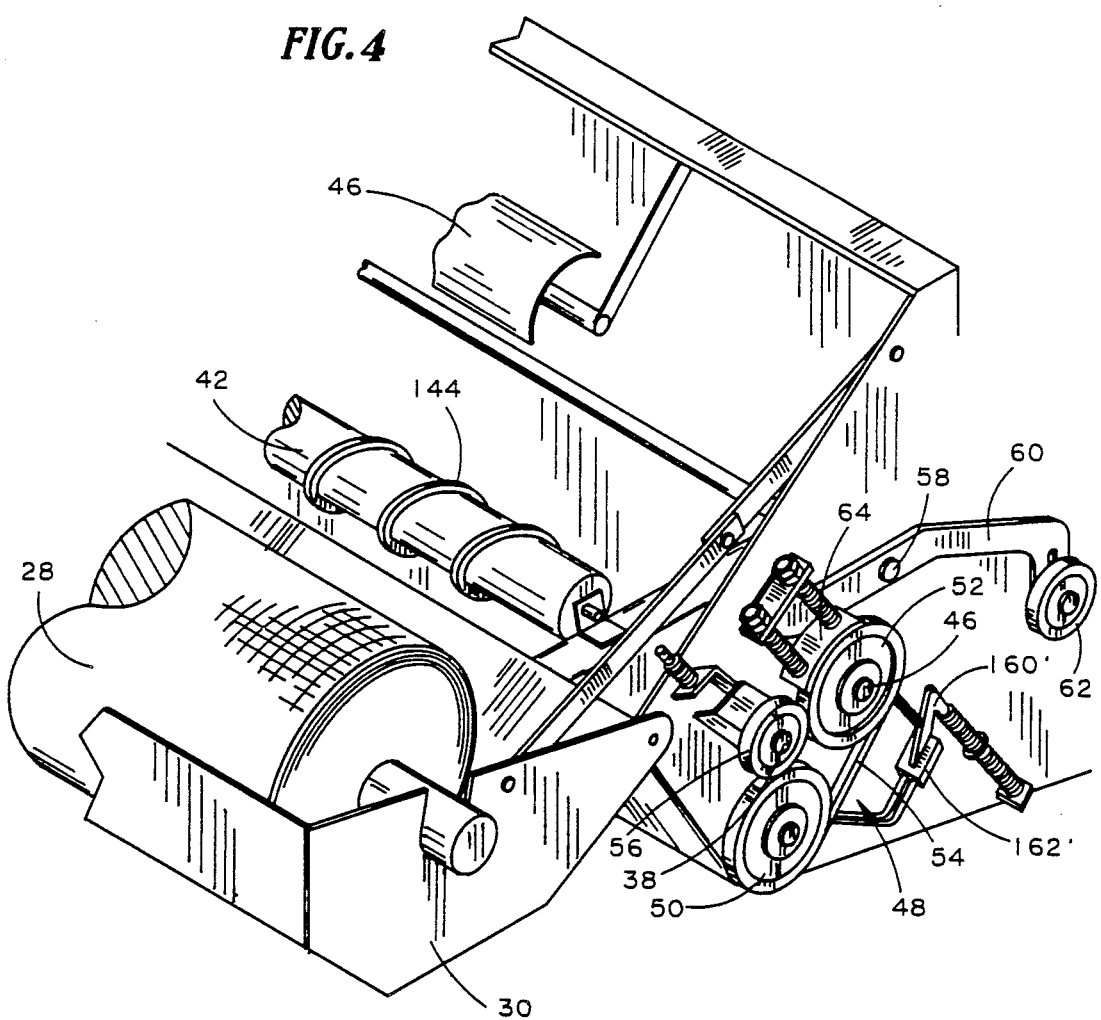
FIG. 4 is a partial perspective view of the belt and pulley drive mechanism mounted on the right hand side of the bale wrap mechanism.

A drive over-center mechanism is illustrated in FIGS. 3 and 7, generally at 72. An over-center pivot arm 74 is journaled about the left hand end portion of the actuating shaft 58 for pivotal movement adjacent the outside of the housing 30. It is pivotally moved by extension and retraction of an electric linear actuator 76 which is pivotally mounted to the housing 30 at its upper, base end. A shaft 80 of the linear actuator 76 and the rearward end of the over-center pivot arm 74 are interconnected by transverse connecting rod 78. The outer end of the connecting rod 78 is received in a linear slot 82 of a guide strap 84. Retraction of the linear actuator 76 pivots the over-center pivot arm 74 in the counterclockwise direction, while extension pivots it in the clockwise direction.

A crank arm 86 is secured at its proximal end portion to the left hand end portion of the drive actuator shaft 58. The free or distal end portion of the crank arm 86 is attached to a double spring biasing device 88 which is anchored at its lower end portion to the housing 30. A pair of adjustable carrying blocks 90 and 92 are mounted on the over-center pivot arm 74 on either side of the crank arm 86. As the pivot arm 70 moves counterclockwise from its extreme clockwise position (which is defined by contact the brake 64 with the driven pulley 52), the block 90 will come into contact with the crank arm 86. Further retraction of the actuator 76 will then pivot counterclockwise the crank arm 86 until the pivot point of the crank arm 86 and the double spring biasing device 88 passes the pivot point of the over-center pivot arm 74 at the shaft 58. The double spring biasing device 88 will then forcefully pivot the crank arm 86 to its extreme counterclockwise position wherein the swinging idler pulley 62 is in contact with the V-belt 54 (FIG. 6B).

Additional retraction of the actuator 76 will not further pivot the crank arm 86 but will continue to pivot the over-center pivot arm 74 to its extreme counterclockwise position which is defined by the fully retracted position of the actuator 76. As the actuator 76 is extended from its fully retracted position, the over-center pivot arm 74 will be pivoted clockwise from its extreme counterclockwise position and the carrying block 92 will come into contact with the crank arm 86. Further extension of the actuator 86 will then pivot clockwise the crank arm 86 until the pivot point between the strap 94 and the crank arm 86 passes the axis of the shaft 58 whereupon the double spring biasing device 88 will forcefully pivot the crank arm 86 in the clockwise direction.

Figure 7A:
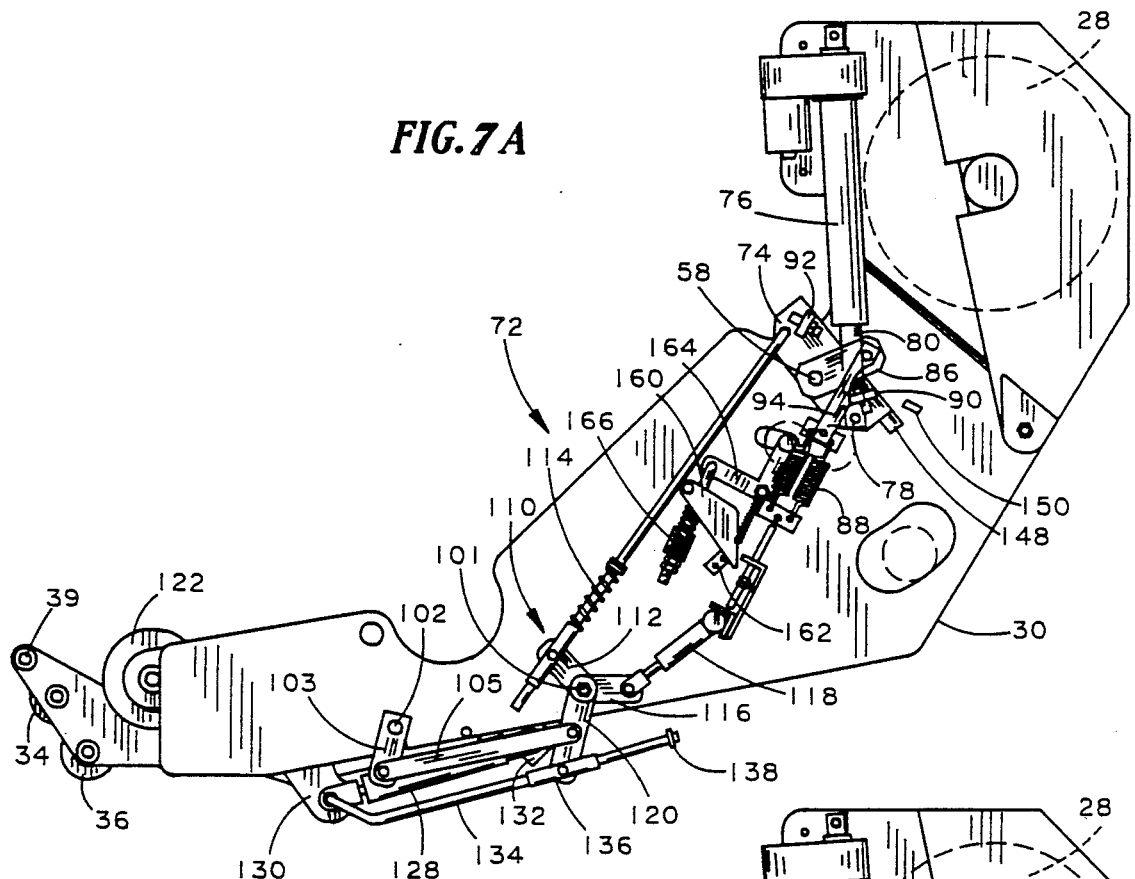
Figure 7B:
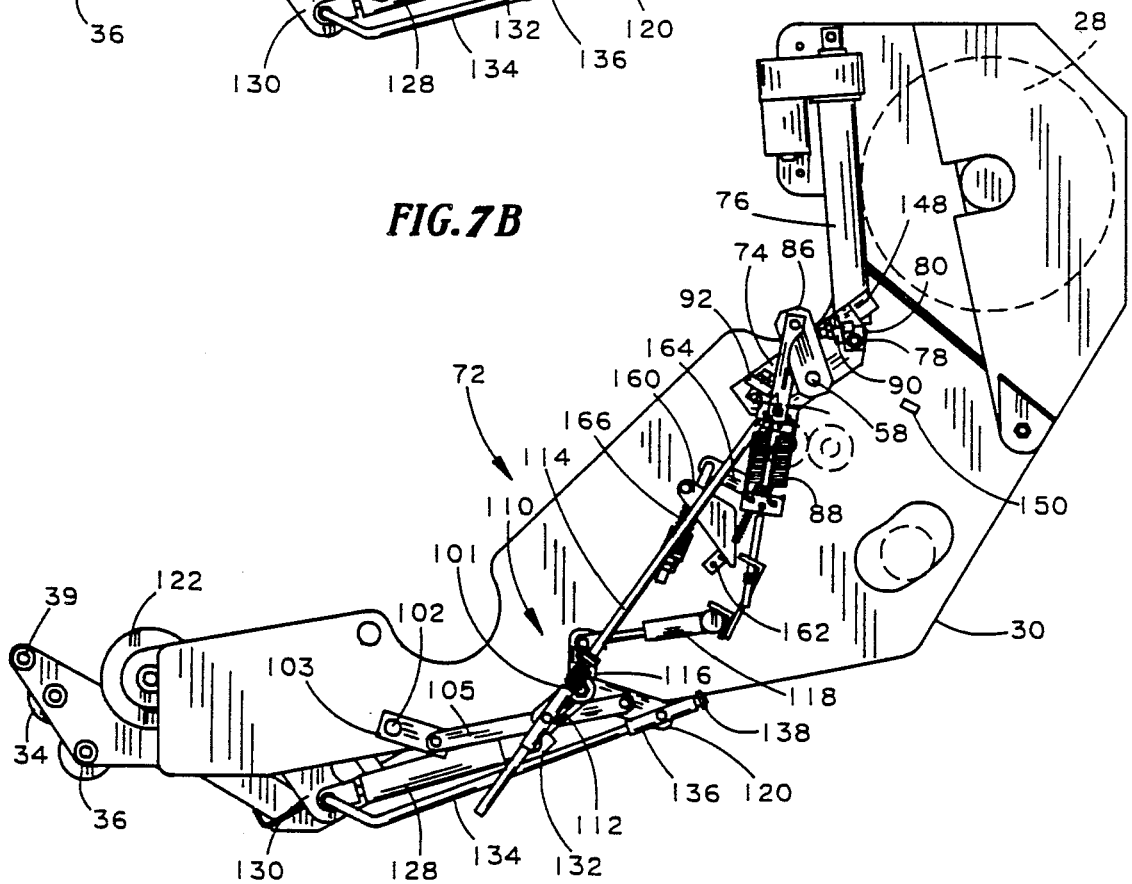

It is common to provide belt guides or separator fingers to prevent the plurality of bale-forming belts from shifting and possibly crossing over each other during operation of the baler 10. A plurality of separator fingers 96 are mounted on a belt guide rack 98 that is pivotally movable about an axis 100 between an upper position, wherein the separator fingers 96 extend upwardly between adjacent bale-forming belts 20 (FIGS. 3, 7A and 8A), and a lower position wherein the fingers 96 are below the wrap feed belts 32 (FIGS. 7B, 7C and 8B). The guide rack 98 is suspended from a transverse rocker shaft 102 by a plurality of J-shaped latches 104 that are spaced from each other along the length of the shaft 102 (FIGS. 8A and 8B). The latches 104 are pivotally attached at one end to an associated arm 106 that is secured to the rocker shaft 102. The other end of the latches 104 is pivotally attached to fore and aft extension arms 108 of the guide rack 98. When the rocker shaft 102 is rotated clockwise, the J-shaped latches 104 lift the guide rack 98 (FIG. 8A), and conversely (FIG. 8B). In the fully clockwise position, the J-shaped latches 104 rest on the rocker shaft 102 whereby no other force or prop structure is required to maintain the guide rack 98 in its upper position (FIG. 8A).

Pivotal movement of the rocker shaft 102 is controlled by bell crank assembly 110 that includes three crank arms that are each secured to a pivotable tube 101 that extends transversely from the housing 30. An actuating crank arm 112 is attached at a proximal end portion thereof to the tube 101. Its distal end slidingly receives an end portion of a push rod and compression spring member 114 which extends upwardly and rearwardly to where it is attached to the forward side portion of the over-center pivot arm 74. Upon counterclockwise pivotal movement of over-center pivot arm 74, the push rod 114 will move relative to the actuating crank arm 112 until the compression spring thereof abuts the actuating crank arm 112 and is sufficiently compressed to pivot the actuating crank arm 112 in the counterclockwise direction. The tube 101 also has secured to it a reset crank arm 120 which is interconnected by a rod 105 to a crank arm 103 secured to the left hand end portion of the rocker shaft 102. Through this linkage, pivotal movement of the actuating crank arm 112 by the push rod 114 from its clockwise t counterclockwise position will lower the belt guide rack 98. An over-center crank arm 116 is also secured to the tube 101. The over-center crank arm 116 has a free or distal end portion that receives a forward end portion of a spring biased push rod 118 for relative pivotal movement therebetween. The rearward end portion of the push rod 118 is mounted on the housing 30 at the attachment site of the double spring biasing device 88. The push rod 118 and over-center crank arm 116 combine to bias movement of the shaft 102, between the extreme clockwise and counterclockwise positions therefor, which correspond to the upper and lower positions, respectively, of the belt guide rack 98 (FIGS. 7B and 7C).

As was described previously, the wrap feed belts 32 are trained about a pair of front rollers 34 and 36 (FIG. 2). These belts 32 are tensioned and put into driving frictional engagement with the bale-forming belts 20 by a toggle roller 122 which is rotatably mounted on a toggle plate 124, one each of which is mounted on either side of the baler to the tailgate 16 at 126 for pivotal movement between a lower, driving position (FIGS. 2 and 7) and an upper, released position (FIG. 5E). Pivotal movement of the toggle plate 124 and toggle roller 122 between the drive and released position is accomplished by a pair of hydraulic cylinders 128, only one of which is illustrated in FIG. 3. The shaft of the cylinder 128 is pivotally attached to a lower lobe 130 of the toggle plate 124 and the base end is pivotally attached to a mounting ear 132 which depends downwardly and rearwardly from a frame member of the bale wrapfeed apparatus 26 (FIGS. 7). Extension of the cylinder 128 pivots the toggle plate 124 clockwise to move the toggle roller 122 toward the released position therefor. Retraction of the cylinder 128 pivots the toggle plate 124 counterclockwise to move the toggle roller 122 toward the drive position therefor.

A reset rod 134 is secured at a forward end thereof to the lower lobe 130 of the toggle plate 124. It extends rearwardly to where its rearward end portion is slidably received inside a tube 136 that is attached to the reset crank arm 120. A nut 138 is threaded on the rearward end of the reset rod 134 and will engage the tube 136 when the reset rod 134 is pulled forwardly. Accordingly, upon retraction of the cylinder 128 to pivot the toggle plate 124 to the engage position therefor, the reset rod 134 will slide inside the tube 136 and thus not move the over-center and reset mechanism 110. Upon extension of the cylinder 128 to release the toggle roller 122, however, the reset rod 134 will be pulled forwardly whereupon the nut 138 will engage the tube 136 to pivot the reset crank arm 120, and thus the crank arm 103 and the shaft 102, in the clockwise direction to reset the belt guide rack 98 from the lower position to the upper position therefor. Clockwise pivotal movement of the reset crank arm 120 will, of course, also pivotally move the actuating crank arm 112 and the over-center crank arm 116 in the clockwise direction. This will reset the actuating crank arm 112 and the over-center crank arm 116 to their fully clockwise positions.

In use, a bale 12 forms inside the baling chamber of the baler 10 until it reaches either the maximum diameter of the baler 10 or some smaller diameter desired by an operator of the baler 10. The diameter of the bale when fully formed can be set on certain models of balers on an automatic full-bale monitor which will alert the operator when the bale has reached the preselected size.

A bale wrapping operation may then be automatically conducted by an electronic control box 140 (FIG. 10). Alternatively, if there is no automatic full-bale monitor, the operator will monitor the size of the bale being formed and will manually initiate the bale wrapping procedure.

Figures 5C, 5D:
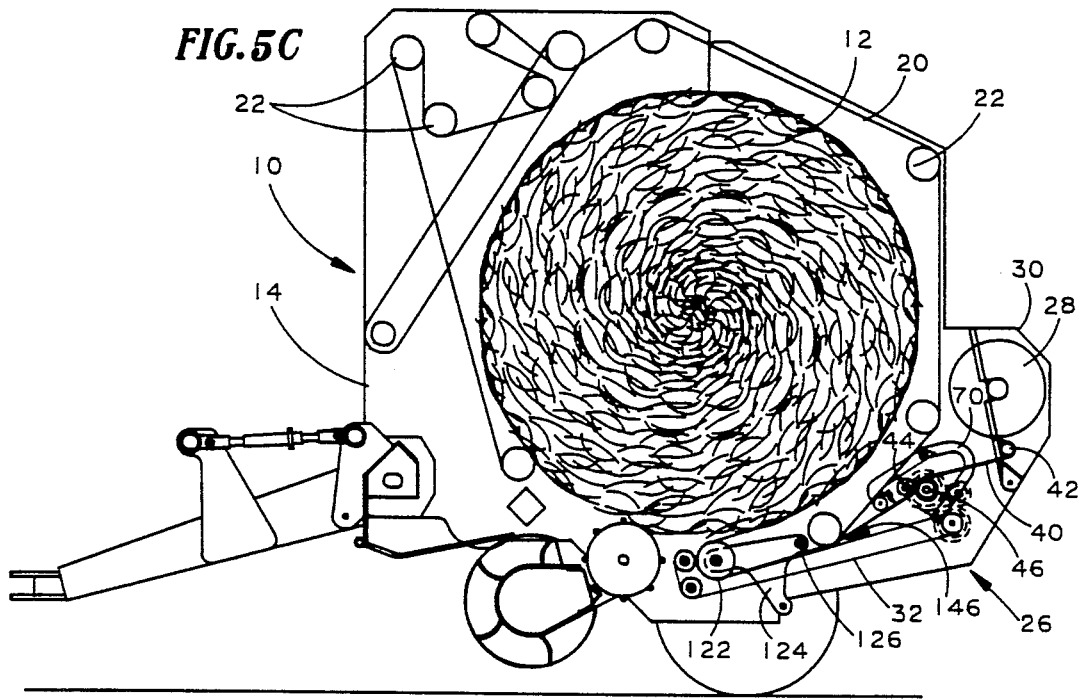
Figure 5E:
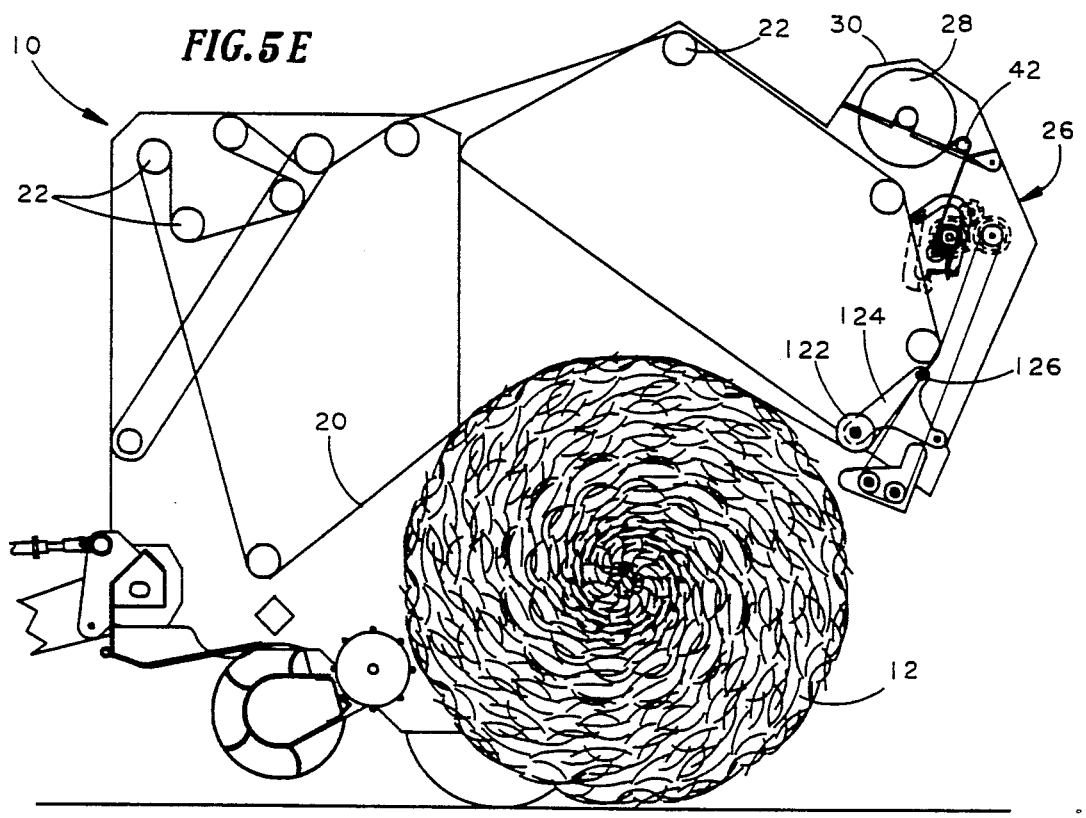

In any event, the wrap feeding apparatus 26 is put into operational condition, as illustrated in FIG. 5A, by mounting a roll 28 of wrap material for rotation on a transverse horizontal shaft and inside the housing 30. The web 40 of wrap material is manually pulled off the roll 28 and trained around the spreading roller 42 and between the net feed rollers 44 and 46. A wrench can be attached to the hub of the driven pulley 44 to rotate the pulleys 44 and 46 to feed the web 40 to the position illustrated in FIG. 5A. In this position, the linear actuator 76 is in its fully extended position (FIG. 7A) such that the crank arm 86 is in its fully clockwise or rearward position. As is illustrated in FIG. 6A, corresponding to the position of FIG. 5A, the shaft 58 has pivoted the arm 60 to put the wrap feed brake 64 in contact with the driven pulley 52 to prevent the net feed rollers 44 and 46 from feeding out wrapping material.

Upon initiation of a wrapping procedure, the linear actuator 76 is energized to begin retracting by the electronic control box 140 that is connected to a battery 142 of a tractor used to operate the baler (FIG. 10). The over-center pivot arm 74 is pivoted counterclockwise, thereby moving the push rod 114 toward the actuating crank arm 112 (FIGS. 3 and 7A). Pivotal counterclockwise movement of the over-center pivot arm 74 will also, as described above, pivot the crank arm 86 in the counterclockwise direction.

When the actuator 76 has moved the pivot arm 74 past its over-center position, the double spring biasing device 88 will forcefully move the push rod 114 and the crank arm 86 to their fully counterclockwise or forward positions (FIG. 7B). The push rod 114 will have pivoted the over-center and reset mechanism 110 to its over-center position wherein the belt guide rack 98 has been moved to its lower position with the separator fingers 96 thereof withdrawn below the wrap feed belts 32. The crank arm 86 will have rotated the shaft 58 to pivot the arm 60 releasing the brake 64 and moving the swinging idler pulley 62 into contact with the V-belt 54 (FIG. 6B). The drive pulley 50 is now drivably engaged to the driven pulley 52 to rotate the wrap feed rollers 44 and 46 in the direction to pull the web 40 from the roll 28.

As the web 40 is pulled from the roll 28 it rotates the spreading roller 42. A helical spreading coil 144 is attached about the periphery of the spreading roller 42 at either end portion thereof. The spreading coils 144 frictionally engage the web 40 and act to spread it across the full length of the spreading roller 42.

As the web 40 is pulled by the feed rollers 44 and 46, it is deposited atop the wrap feed belts 32 (FIG. 5B) which will carry the web 40 into the nip point 146 where the bale-forming belts 20 contact with the wrap feed belts 32. The web 40 is then engaged by the belts 20 and 32 and fed into the baling chamber.

Immediately after the linear actuator 76 has reached its fully retracted position, the electronic control box 140 reverses the actuator 76 to start its extension cycle. As the pivot arm 74 is pivoted clockwise, the carrying block 92 will come into contact with and pivot clockwise the crank arm 86, which in turn will pivot the shaft 58 to move the swinging idler pulley 62 out of contact with the V-belt 54 thereby disengaging the drive mechanism 48. The wrap feed rollers 44 and 46 can now "free wheel" to permit the withdrawal therebetween of the wrap material from the roll 28 by the force exerted on the web 40 by the belts 20 and 32. A spring biased drag brake 146 (FIG. 3) is mounted inside the housing 30 and is in frictional contact with the roll 28 to prevent the web 40 from freely paying off of the roll 28 except when being forcefully extracted either by the wrap feed rollers 44 and 46 or by the belts 20 and 32. The drag brake 146 will also tension the web 40 to improve results of the bale wrapping operation.

The linear actuator 76 continues to retract, pivoting the pivot arm 74 and the crank arm 86 in the clockwise direction. During this interval, the drive mechanism 48 continues to "free wheel", the belt guide rack 98 remains in its lower position, and the web 40 is being wrapped around the bale 12 in the baling chamber by action of the belts 20. The linear actuator 76 retracts until the pivot arm 74 has been moved to a position wherein a flag 148 which extends rearwardly of the pivot arm 74 opens a normally closed magnetic reed switch 150 attached to the housing 30. The reed switch 150 and flag 148 are positioned to open the reed switch 150 just prior to movement of the crank arm 86 to the clockwise over-center position of the double spring biasing device 88. The reed switch 150 is monitored by the electronic control box 140 (FIG. 10). When the reed switch 150 is opened by the flag 148, the electronic control box 140 turns off the linear actuator 76 for a time interval that is adjustable at the electronic control box 140 by the operator. The hesitation or dwell time is selected to correspond to the amount of wrap material or number of wraps around the bale that are desired under the circumstances.

At the expiration of the dwell time interval, the electronic control box 140 again energizes the linear actuator 76 to resume extension thereof. Very shortly after extension is resumed, the crank arm 86 is moved past its over-center position and the double spring bias device 88 forcefully moves it to the extreme clockwise or rearward position. This motion pivots the shaft 58 thereby moving the arm 60 of the drive mechanism 48 (FIG. 4) to bring the brake 64 into contact with the driven pulley 52. The brake 64 stops the rotation of the wrap feed rollers 44 and 46. Contemporaneously with the movement of the brake 64, the swinging knife 66 is pivoted to shear the web 40 by passing adjacent to the fixed knife 68. The tension in the web 40 caused by braking of the web feed rollers 44 and 46 assists in the cutting or shearing of the web 40. The baler 10 is operated for a short time after shearing of the web to wrap the tail end of the separated portion about the bale 12.

After the wrapping material has been applied to the bale, the wrapped bale is ejected from the baler by opening of the tailgate 16. A tailgate control valve 152 is operated to direct pressurized hydraulic fluid from the tractor through a tailgate lock valve 154 and to the pair of tailgate cylinders 24 and 24' one of which is mounted on either side of the baler 10 (FIG. 9). Pressurized hydraulic fluid is also directed to the toggle roller cylinders 128 and 128'. Because the tailgate cylinders 24 and 24' are connected in parallel with the toggle roller cylinders 128 and 128', the hydraulic fluid will first move the cylinders which have the least resistance. Since the toggle roller cylinders 128 and 128' do not have to exert much force to pivot the toggle plates 124 and return the belt guide rack 98 to its upper position, the toggle roller cylinders 128 and 128' will first be extended while the tailgate cylinders 24 and 24' are unchanged. Extension of the toggle roller cylinders 128 and 128' will pivot the toggle plates 124 about pivot point 126 (FIG. 2) to the released position (FIG. 5E). Clockwise pivotal movement of the toggle plate 124 will also reset the belt guide rack 98 to its upper position, as well as the ball crank mechanism 110, by action of the reset rod 124 on the reset crank arm 120 (FIG. 3).

Figure 5F:
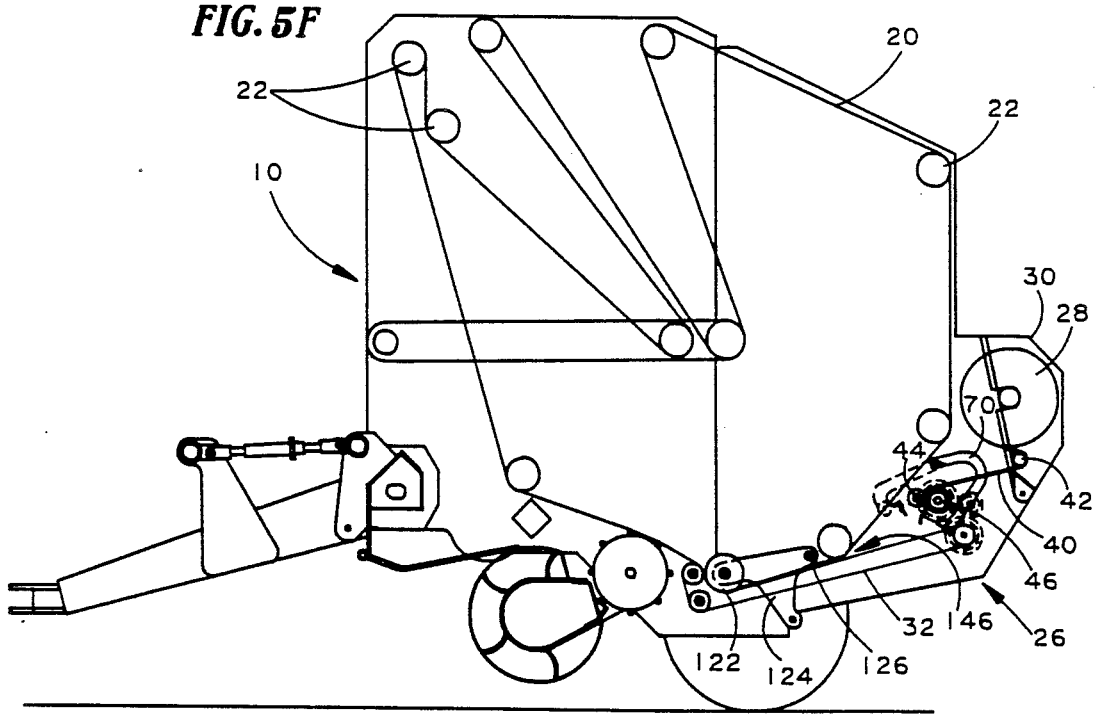

After the toggle roller cylinders 128 and 128' have reached their maximum extended positions, the pressurized hydraulic fluid will act to extend the tailgate cylinders 24 and 24' to open the tailgate 16 (FIG. 5E). The toggle roller 122 has been moved to its released position whereby the bale-forming belts 20 and the wrap feed belts 32 are no longer in driving engagement. The bale-forming belts 20 have a tendency to turn backwards during the ejection of a bale. Release of the toggle roller 122 thus acts to prevent the wrap feed belts 32 from being moved backwardly to eliminate the problem of removing crop material and wrap material from the periphery of the bale. Upon opening of the tailgate 16, the bale is discharged from the baling chamber onto the ground in the customary manner. The tailgate 16 is then closed by operation of the control valve 152. After retraction of the tailgate cylinders 24 and 24' to close the tailgate 16, the toggle roller cylinders 128 and 128' are retracted to return the toggle roller 122 to its belt engaging position (FIG. 5F). The hydraulic circuitry of the baler 10 includes a pilot actuated double lock valve 156 which holds the cylinders 128 and 128' in whatever position they are at when the controls are released so as to prevent undesired "creep" due to a leak in a remote part of the hydraulic circuitry.

A pair of wrap sensing arms (not shown) are mounted one each on either side of the housing 30 and extend inwardly adjacent the web 40 when it is being pulled by the belts 20 and 32 (FIGS. 3 and 4). The wrap sensing arms are deflected upwardly if the web 40 is being pulled into the baling chamber. A flag 160 is secured to each wrap sensing arm and pivots together with the arm adjacent the outer side walls of the housing 30. A pair of magnetic reed switches 162 and 162' are mounted on the side wall of the housing adjacent a corresponding one of the flags 160. The position of the reed switch is adjusted so that it changes from its normally closed condition to an open condition when the corresponding wrap sensing arm is not deflected upwardly by the web 40. If either reed switch is closed, indicating that the web 40 is not fully extended across the width of the baler or that no wrap material is being pulled into the baling chamber, a warning light is illuminated at the electronic control box 140 (FIG. 9).

The driven wrap feed roller 46 is fixedly mounted for pivotal movement relative to the housing 30. The idler feed roller 44, however, is mounted in an elongated hole on either side of the housing for limited movement toward and away from the driven wrap feed roller 46. A pair of L-shaped arms 164 and 164' are attached at one end thereof to the end portions of the idler feed roller 44, one at each side of the housing 30 (FIGS. 3 and 4). The idler feed roller 44 is urged into contact with the driven feed roller 46 by a spring 166 or 166' held in compression against the second end of a corresponding one of the L-shaped arms 164 or 165' by a mounting bracket 168 or 168'.

In the preferred embodiment, a woven polyethylene net wrap material sold under the brand name "Tamanet" by the Tamaco Company in Israel, and by other companies under other names, is used as the wrap material. Alternatively, a polypropylene net material or continuous, unfenestrated plastic sheeting can be used. In the case of the net materials, the fibrous stalks and stems of the crop material that forms the bale tends to extend through the openings of the net wrap thereby securing the net wrap from unintentional release or unwrapping from the bale. With unfenestrated plastic sheeting, the sheeting tends to stick to itself and will thereby be retained about the bale. The number of turns of net wrap to be put on the bale varies with the crop material being baled. For dry alfalfa hay, approximately two and one-half turns are sufficient to secure adequately the net wrap about the bale. For pangola grass, a more springy crop with stiff stems, approximately three and one-half turns will be desired.

When plastic film is used as the wrapping material, the swinging knife 66 is modified by the addition of a comb-like structure mounted underneath the knife blade on the U-shaped arm 70. The comb-like structure presents a plurality of piercing points which extend slightly past the knife edge to puncture the plastic film at approximately 2-inch intervals. The comb-like structure helps to achieve a more even separation line of the plastic film.

The baler 10 is typically provided with a twine-tie mechanism, such as the mechanism described in U.S. Pat. No. 4,174,661, which patent is incorporated herein by this reference. The twine-tie mechanism is shut off and not used when the bale is wrapped with a web of wrap material. It has been found, however, that the twine-tie mechanism can be used in conjunction with the wrap feeding mechanism to use twine to further secure the wrap material about the bale. After the wrap procedure has started, the twine-tie mechanism is activated by the operator. Twine will then be dispensed and wrapped about the bale together with the wrap material. Following completion of the wrapping procedure and before ejection of the bale, an additional two or three turns of the bale are made to self-secure the twine in the usual fashion. The bale is then ejected from the baler.

I claim:

1. In a baler having a bale chamber for receiving crop material and including driven belts within the chamber for forming a bale, a bale wrapping apparatus, comprising:
   (a) a rolled web of bale wrapping material mounted for rotation at a rear end portion of the baler;
   (b) a pair of parallel, adjacent rollers which engage therebetween a free end portion of said web;
   (c) at least one non driven web feeding belt movable into and out of driving contact engagement over a portion thereof with at least one of the driven belts;
   (d) drive means for said rollers for unrolling said web to deposit said free end portion on said web feeding belt which conveys said web into the bale chamber where it is wrapped about a formed bale by the driven belts; and
   (e) means for separating said web between the baling chamber and said roll.

2. A bale wrapping apparatus as defined in claim 1, further comprising a drag brake for maintaining tension on said web during the bale wrapping process.

3. A bale wrapping apparatus as defined in claim 1, wherein said drive means has a brake which stops said rollers after the bale has been wrapped and during separation of said web.

4. A bale wrapping apparatus as defined in claim 1, wherein said rollers are allowed to free wheel while the bale is being wrapped with said web.

5. A bale wrapping apparatus as defined in claim 1, further comprising a spreading roller which engages said web to spread the web across substantially the full width of the bale.

6. A bale wrapping apparatus as defined in claim 1, further comprising a belt guide rack carrying a plurality of fingers movable between a belt separator position during formation of a bale and a withdrawn position during wrapping of the bale wherein said fingers do not extend between said belts.

7. A bale wrapping apparatus as defined in claim 1, wherein said drive means comprises:
   (a) a web feeding belt roller on one end of which is mounted a drive pulley;
   (b) a driven pulley mounted on one end of one of said web engaging rollers;
   (c) belt means trained about each of said pulleys; and
   (d) an idler pulley for engaging said belt means whereby said rotation of said web feeding belt roller causes rotation of said web engaging roller.

8. A bale wrapping apparatus as defined in claim 1, wherein said web separating means comprises a pair of coacting knives which move relative to each other to separate said web.

9. A bale wrapping apparatus as defined in claim 1, wherein said wrapping material is a web of net material which is retained about the bale by crop material which extends through said net material.

10. A bale wrapping apparatus as defined in claim 1, wherein:
    (a) said drive means includes a first pivot arm to one end of which is mounted a brake and to the other end of which is mounted an idler pulley;
    (b) said separation means includes a knife mounted on an end portion of a second pivot arm; and
    (c) said first and second pivot arms are secured to a common shaft for coordinated movement of said brake, idler pulley, and knife to drive and brake said rollers and to separate said web.

11. A bale wrapping apparatus as defined in claim 1 further comprising a twine tie mechanism for wrapping twine about the formed bale substantially simultaneously with said wrapping material.

12. A bale wrapping apparatus as defined in claim 1 wherein said nondriven web feeding belt is moved into and out of driving contact engagement with said driven belt by a toggle roller pivotable between a lower, driving position and an upper, released position.

* * * * *